United States Patent
Su et al.

(10) Patent No.: US 11,490,409 B2
(45) Date of Patent: Nov. 1, 2022

(54) RESOURCE ALLOCATION METHOD AND APPARATUS

(71) Applicant: HUAWEI TECHNOLOGIES CO., LTD., Guangdong (CN)

(72) Inventors: Liyan Su, Beijing (CN); Chaojun Li, Beijing (CN); Zhihua Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 17/062,313

(22) Filed: Oct. 2, 2020

(65) Prior Publication Data

US 2021/0022166 A1 Jan. 21, 2021

Related U.S. Application Data

(63) Continuation of application No. PCT/CN2018/082058, filed on Apr. 4, 2018.

(51) Int. Cl.
*H04W 72/12* (2009.01)
*H04W 72/04* (2009.01)

(52) U.S. Cl.
CPC ... *H04W 72/1284* (2013.01); *H04W 72/0446* (2013.01)

(58) Field of Classification Search
CPC .............. H04W 72/0446; H04W 72/1284
See application file for complete search history.

(56) References Cited

U.S. PATENT DOCUMENTS

| | | | |
|---|---|---|---|
| 2009/0196204 A1 | 8/2009 | Astely et al. | |
| 2011/0201341 A1 | 8/2011 | Choudhury et al. | |
| 2017/0041063 A1 | 2/2017 | Speight et al. | |
| 2018/0249499 A1* | 8/2018 | Kim | H04W 74/08 |
| 2020/0260456 A1* | 8/2020 | Shi | H04W 72/0453 |
| 2021/0076361 A1* | 3/2021 | Takeda | H04L 5/0053 |

FOREIGN PATENT DOCUMENTS

| | | |
|---|---|---|
| CN | 101132267 A | 2/2008 |
| CN | 103327615 A | 9/2013 |
| CN | 103516503 A | 1/2014 |

(Continued)

OTHER PUBLICATIONS

Extended European Search Report issued in European Application No. 18913947.0 dated Feb. 12, 2021, 10 pages.

(Continued)

*Primary Examiner* — Michael Thier
*Assistant Examiner* — Nevena Zecevic Sandhu
(74) *Attorney, Agent, or Firm* — Fish & Richardson P.C.

(57) ABSTRACT

Embodiments of this application provide resource allocation methods and apparatuses. One method includes: receiving, by a terminal device, resource allocation information that indicates a first resource, determining, by the terminal device, a second resource based on the resource allocation information and an offset value represented by M, wherein the offset value is configured based on higher layer signaling and indicates a start location of the first resource offsets from a start location of the second resource by M resource units, and sending, by the terminal device, uplink data on the second resource to a network device.

16 Claims, 6 Drawing Sheets

(56) References Cited

FOREIGN PATENT DOCUMENTS

WO  2015191963 A1  12/2015
WO  2017150942 A1   9/2017

OTHER PUBLICATIONS

3GPP TS 36.212 V15.1.0 (Mar. 2018), "3rd Generation Partnership Project; Technical Specification Group Radio Access Network; Evolved Universal Terrestrial Radio Access (E-UTRA); Multiplexing and channel coding(Release 15)," Mar. 2018, 234 pages.
3GPP TS 36.213 V15.1.0 (Mar. 2018), "3rd Generation Partnership Project; Technical Specification Group Radio Access Network; Evolved Universal Terrestrial Radio Access (E-UTRA); Physical layer procedures (Release 15)," Mar. 2018, 501 pages.
PCT International Search Report and Written Opinion issued in International Application No. PCT/CN2018/082058 dated Jan. 4, 2019, 20 pages (with English translation).

* cited by examiner

RESOURCE ALLOCATION METHOD AND APPARATUS

CROSS-REFERENCE TO RELATED APPLICATIONS

This application is a continuation of International Application No. PCT/CN2018/082058, filed on Apr. 4, 2018, the disclosure of which is hereby incorporated by reference in its entirety.

TECHNICAL FIELD

This application relates to the communications field, and more specifically, to a resource allocation method and apparatus in the communications field.

BACKGROUND

In a long term evolution (Long Term Evolution, LTE) system, a network device may indicate a resource by using resource indication information included in downlink control information (Downlink Control Information, DCI), so that a terminal device sends uplink data on the resource.

A short resource block group (shortened resource block group, sRBG) is introduced into a shortened transmission time interval (shortened Transmission Time Interval, sTTI) transmission mechanism in LTE. A minimum granularity of resource scheduling in the sTTI transmission mechanism is the short resource block group.

However, in an sTTI scenario, when a network device schedules uplink data by using DCI in an sTTI, more than 10% of a resource cannot be scheduled, causing a waste of system resources.

Therefore, a technology needs to be urgently provided to resolve the foregoing problem and reduce the waste of the system resources.

SUMMARY

This application provides a resource allocation method and apparatus, to help reduce a waste of system resources.

According to a first aspect, a resource allocation method is provided. The method includes:

receiving resource allocation information, where the resource allocation information includes a first resource indicator value; and determining, based on the first resource indicator value, a first resource allocation scheme corresponding to the first resource indicator value, where the first resource allocation scheme belongs to L resource allocation schemes, the L resource allocation schemes include L1 resource allocation schemes, and the L1 resource allocation schemes one-to-one correspond to L1 resource indicator values, where $$C_{N+1}^2 < L \leq 2^{\lceil log_2(C_{N+1}^2) \rceil},$$
$$L1 = L - C_{N+1}^2, N = \lfloor Q/X \rfloor,$$

Q is a quantity of resource units that corresponds to a system bandwidth, Q is an integer greater than 1, and X is an integer greater than 2; and a start location of a resource corresponding to each of the L1 resource allocation schemes is a resource unit other than an $(S+1)^{th}$ resource unit in Q consecutive resource units in the system bandwidth, where S is an integer multiple of X.

X is a quantity of resource units included in each of at least one resource unit group included in the resource corresponding to each resource allocation scheme.

Therefore, according to the resource allocation method provided in this embodiment of this application, the L resource allocation schemes are provided, so that a terminal device can send uplink data by using the L resource allocation schemes. The start location of the resource corresponding to each of the L1 resource allocation schemes in the L resource allocation schemes is the resource unit other than the $(S+1)^{th}$ resource unit in the Q consecutive resource units in the system bandwidth, where S is an integer multiple of X, and X is the quantity of resource units included in each of the at least one resource unit group included in the resource corresponding to each resource allocation scheme. In this case, when a resource needs to be allocated to an sPUCCH and a scheduled resource needs to satisfy a prime factor constraint, more resources can be allocated by using the L1 resource allocation schemes for transmission of the uplink data, and the prime factor constraint is relatively well satisfied, thereby reducing a bandwidth loss and reducing a waste of system resources.

In a possible implementation, the L resource allocation schemes further include L2 resource allocation schemes, the L2 resource allocation schemes one-to-one correspond to L2 resource indicator values, and a start location of a resource corresponding to each of the L2 resource allocation schemes is the $(S+1)^{th}$ resource unit in the Q consecutive resource units in the system bandwidth, where $L2=C_{N+1}^2$.

In a possible implementation, a value range of the first resource indicator value K is $K \in [0, 2^{\lceil log_2(C_{N+1}^2) \rceil}-1]$, K is an integer, L values in $2^{\lceil log_2(C_{N+1}^2) \rceil}$ values of K are used to indicate the L resource allocation schemes, and each value is used to indicate one resource allocation scheme; and when $K \in [0, C_{N+1}^2-1]$, the first resource allocation scheme is any one of the L2 resource allocation schemes; or when $K \in [C_{N+1}^2, L-1]$, the first resource allocation scheme is any one of the L1 resource allocation schemes.

Therefore, according to the resource allocation method provided in this embodiment of this application, $C_{N+1}^2$ values in $[0, C_{N+1}^2-1]$, one-to-one correspond to the L2 resource allocation schemes, and if $K \in [0, C_{N+1}^2-1]$, the first resource allocation scheme is any one of the L2 resource allocation schemes. $(L-C_{N+1}^2)$ values in $[C_{N+1}^2, L-1]$ one-to-one correspond to the L1 resource allocation schemes, and if $K \in [C_{N+1}^2, L-1]$, the first resource allocation scheme is any one of the L1 resource allocation schemes. In this way, more optional schemes can be added for uplink resource allocation without increasing a quantity of resource indicator values, thereby improving flexibility of the uplink resource allocation.

In a possible implementation, the first resource indicator value K is represented by $\lceil log_2(C_{N+1}^2) \rceil$ bits.

In a possible implementation, X=4.

In a possible implementation, the first resource indicator value K=325, Q=100, and a resource corresponding to the first resource allocation scheme is the third resource unit to the 98th resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

According to a second aspect, a resource allocation method is provided. The method includes:

receiving resource allocation information, where the resource allocation information is used to indicate a first resource;

determining a second resource based on the resource allocation information and an offset value, where the offset value indicates a quantity M of resource units that offset from a start location of the first resource relative to a start location of the second resource, and the offset value is predefined or configured by using higher layer signaling, where M≥1; and sending uplink data on the second resource.

Therefore, according to the resource allocation method provided in this embodiment of this application, when a network device schedules a resource by using a resource unit group, a start location of the scheduled resource can be effectively adjusted by introducing the offset value, so that the start location of the scheduled resource can be a resource unit other than an $(S+1)^{th}$ resource unit in a system bandwidth, where S is an integer multiple of X, and X is a quantity of resource units included in one resource unit group. In this case, when a resource needs to be allocated to an sPUCCH and a scheduled resource needs to satisfy a prime factor constraint, in this embodiment of this application, more resources can be allocated for transmission of the uplink data, and the prime factor constraint is relatively well satisfied, thereby reducing a bandwidth loss.

In addition, DCI overheads can be effectively reduced by predefining the offset value or configuring the offset value by using the higher layer signaling, and DCI reliability can be effectively improved when a resource used to send the uplink data remains unchanged.

In a possible implementation, 1≤M≤(X−1), where X is the quantity of resource units included in each of at least one resource unit group included in the system bandwidth, and X is an integer greater than 2.

The offset value M is limited, so that as many resources as possible can be used for PUSCH transmission instead of being occupied by a PUCCH, thereby increasing a maximum quantity of resource units that can be scheduled for a PUSCH.

In a possible implementation, the determining a second resource based on the resource allocation information and an offset value includes:

determining the start location of the second resource based on the start location of the first resource and the offset value; and determining the second resource based on the start location of the second resource and a quantity of resource units that corresponds to the first resource.

In a possible implementation, a resource indicator value RIV, the start location $RB_{START}$ of the second resource, a quantity P of resource unit groups, and the offset value M meet the following relationship:

when $P-1 \leq \lfloor N/2 \rfloor, RIV=N(P-1)+(RB_{START}-M)/X$; or when $P-1 > \lfloor N/2 \rfloor, RIV=N(N-P+1)+[N-1-(RB_{START}-M)/X]$, where RIV indicates the resource indicator value that is included in the resource allocation information and that is used to indicate the first resource;

$N=\lfloor Q/X \rfloor$, Q is a quantity of resource units that corresponds to the system bandwidth, Q is an integer greater than 1, and X is an integer greater than 2; and P indicates the quantity of resource unit groups included in the second resource, and each of the P resource unit groups includes X resource units, where $1 \leq P \leq [N-(RB_{START}-M)/X]$.

In a possible implementation, X=4.

According to a third aspect, a resource allocation method is provided. The method includes:

generating resource allocation information, where the resource allocation information includes a first resource indicator value, the first resource indicator value is used to indicate a first resource allocation scheme, the first resource allocation scheme belongs to L resource allocation schemes, the L resource allocation schemes include L1 resource allocation schemes, and the L1 resource allocation schemes one-to-one correspond to L1 resource indicator values, where $$C_{N+1}^2 < L \leq 2^{\lceil \log_2(C_{N+1}^2) \rceil},$$
$$L1 = L - C_{N+1}^2, N = \lfloor Q/X \rfloor,$$

Q is a quantity of resource units that corresponds to a system bandwidth, Q is an integer greater than 1, and X is an integer greater than 2; and a start location of a resource corresponding to each of the L1 resource allocation schemes is a resource unit other than an $(S+1)^{th}$ resource unit in Q consecutive resource units in the system bandwidth, where S is an integer multiple of X; and sending the resource allocation information.

X is a quantity of resource units included in each of at least one resource unit group included in the resource corresponding to each resource allocation scheme.

Therefore, according to the resource allocation method provided in this embodiment of this application, the L resource allocation schemes are provided, so that a terminal device can send uplink data by using the L resource allocation schemes. The start location of the resource corresponding to each of the L1 resource allocation schemes in the L resource allocation schemes is the resource unit other than the $(S+1)^{th}$ resource unit in the Q consecutive resource units in the system bandwidth, where S is an integer multiple of X, and X is the quantity of resource units included in each of the at least one resource unit group included in the resource corresponding to each resource allocation scheme. In this case, when a resource needs to be allocated to an sPUCCH and a scheduled resource needs to satisfy a prime factor constraint, more resources can be allocated by using the L1 resource allocation schemes for transmission of the uplink data, and the prime factor constraint is relatively well satisfied, thereby reducing a bandwidth loss and reducing a waste of system resources.

In a possible implementation, the L resource allocation schemes further include L2 resource allocation schemes, the L2 resource allocation schemes one-to-one correspond to L2 resource indicator values, and a start location of a resource corresponding to each of the L2 resource allocation schemes is the $(S+1)^{th}$ resource unit in the Q consecutive resource units in the system bandwidth, where $L2=C_{N+1}^2$.

In a possible implementation, a value range of the first resource indicator value K is $K \in [0, 2^{\lceil \log_2(C_{N+1}^2) \rceil}-1]$, K is an integer, L values in $2^{\lceil \log_2(C_{N+1}^2) \rceil}$ values of K are used to indicate the L resource allocation schemes, and each value is used to indicate one resource allocation scheme; and when $K \in [0, C_{N+1}^2-1]$, the first resource allocation scheme is any one of the L2 resource allocation schemes; or when $K \in [C_{N+1}^2, L-1]$, the first resource allocation scheme is any one of the L1 resource allocation schemes.

Therefore, according to the resource allocation method provided in this embodiment of this application, $C_{N+1}^2$ values in $[0, C_{N+1}^2-1]$ one-to-one correspond to the L2 resource allocation schemes, and if $K \in [0, C_{N+1}^2-1]$, the first resource allocation scheme is any one of the L2 resource allocation schemes. $(L-C_{N+1}^2)$ values in $[C_{N+1}^2, L-1]$ one-to-one correspond to the L1 resource allocation schemes, and if $K \in [C_{N+1}^2, L-1]$, the first resource allocation scheme is any one of the L1 resource allocation schemes. In this way, more optional schemes can be added for uplink resource allocation without increasing a quantity of resource indicator values, thereby improving flexibility of the uplink resource allocation.

In a possible implementation, the first resource indicator value K is represented by $\lceil \log_2(C_{N+1}^2) \rceil$ bits.

In a possible implementation, X=4.

According to a fourth aspect, a resource allocation method is provided. The method includes:

generating resource allocation information, where the resource allocation information is used to indicate a first resource, a quantity of resource units that offset from a start location of the first resource relative to a start location of a second resource is M, M is predefined or configured by using higher layer signaling, M≥1, and the second resource is used to indicate a terminal device to send uplink data on the second resource; and sending the resource allocation information.

Therefore, according to the resource allocation method provided in this embodiment of this application, when a network device schedules a resource by using a resource unit group, a start location of the scheduled resource can be effectively adjusted by introducing the offset value, so that the start location of the scheduled resource can be a resource unit other than an $(S+1)^{th}$ resource unit in a system bandwidth, where S is an integer multiple of X, and X is a quantity of resource units included in one resource unit group. In this case, when a resource needs to be allocated to an sPUCCH and a scheduled resource needs to satisfy a prime factor constraint, in this embodiment of this application, more resources can be allocated for transmission of the uplink data, so that the prime factor constraint is relatively well satisfied, thereby reducing a bandwidth loss and reducing a waste of system resources.

In a possible implementation, 1≤M≤(X−1), and X is a quantity of resource units included in each of at least one resource unit group included in the system bandwidth.

In a possible implementation, a resource indicator value RIV, the start location $RB_{START}$ of the second resource, a quantity P of resource unit groups, and M meet the following relationship:

when $P-1 \leq \lfloor N/2 \rfloor, RIV=N(P-1)+(RB_{START}-N)/X$; or when $P-1 > \lfloor N/2 \rfloor, RIV=N(N-P+1)+[N-1-(RB_{START}-M)/X]$, where RIV indicates the resource indicator value that is included in the resource allocation information and that is used to indicate the first resource;

$N=\lfloor Q/X \rfloor$, is a quantity of resource units that corresponds to the system bandwidth, Q is an integer greater than 1, and X is an integer greater than 2; and P indicates the quantity of resource unit groups included in the second resource, and each of the P resource unit groups includes X resource units, where $1 \leq P \leq [N-(RB_{START}-M)/X]$.

In a possible implementation, the method further includes:

sending the higher layer signaling, where the higher layer signaling is used to indicate M.

In a possible implementation, X=4.

According to a fifth aspect, a resource allocation apparatus is provided. The apparatus may be configured to perform an operation of the terminal device according to any one of the first aspect, the second aspect, or the possible implementations of the first aspect and the second aspect. Specifically, the apparatus may include a module or a unit configured to perform the operations of the terminal device according to any one of the first aspect, the second aspect, or the possible implementations of the first aspect and the second aspect.

According to a sixth aspect, a resource allocation apparatus is provided. The apparatus may be configured to perform an operation of the network device according to any one of the third aspect, the fourth aspect, or the possible implementations of the third aspect and the fourth aspect. Specifically, the apparatus may include a module or a unit configured to perform the operations of the network device according to any one of the third aspect, the fourth aspect, or the possible implementations of the third aspect and the fourth aspect.

According to a seventh aspect, a terminal device is provided. The terminal device includes a processor, a transceiver, and a memory. The processor, the transceiver, and the memory communicate with each other through an inner connection path. The memory is configured to store an instruction, and the processor is configured to execute the instruction stored in the memory. When the processor executes the instruction stored in the memory, the execution enables the terminal device to perform the method according to any one of the first aspect, the second aspect, or the possible implementations of the first aspect and the second aspect, or the execution enables the terminal device to implement the apparatus according to the fifth aspect.

According to an eighth aspect, a network device is provided. The network device includes a processor, a transceiver, and a memory. The processor, the transceiver, and the memory communicate with each other through an inner connection path. The memory is configured to store an instruction, and the processor is configured to execute the instruction stored in the memory. When the processor executes the instruction stored in the memory, the execution enables the network device to perform the method according to any one of the third aspect, the fourth aspect, or the possible implementations of the third aspect and the fourth aspect, or the execution enables the network device to implement the apparatus according to the sixth aspect.

According to a ninth aspect, a chip system is provided. The chip system includes a memory and a processor. The memory is configured to store a computer program, and the processor is configured to invoke the computer program from the memory and run the computer program, so that a communications device in which the chip system is installed performs the method according to any one of the first to the fourth aspects or the possible implementations of the first to the fourth aspects.

According to a tenth aspect, a computer program product is provided. The computer program product includes computer program code. When the computer program code is run by a communications unit and a processing unit or by a transceiver and a processor of a communications device (such as a network device or a terminal device), the communications device is enabled to perform the method according to any one of the first to the fourth aspects or the possible implementations of the first to the fourth aspects.

According to an eleventh aspect, a computer-readable storage medium is provided. The computer-readable storage medium stores a program, and the program enables a communications device (such as a network device or a terminal device) to perform the method according to any one of the first to the fourth aspects or the possible implementations of the first to the fourth aspects.

According to a twelfth aspect, a computer program is provided. When the computer program is executed on a computer, the computer is enabled to implement the method according to any one of the first to the fourth aspects or the possible implementations of the first to the fourth aspects.

In some of the foregoing implementations, the first resource indicator value K=326, Q=100, and the resource corresponding to the first resource allocation scheme is the second resource unit to the $97^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in some of the foregoing implementations, the first resource indicator value K=326, Q=100, and the resource corresponding to the first resource allocation scheme is the third resource unit to the $98^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in some of the foregoing implementations, the first resource indicator value K=325, Q=100, and the resource corresponding to the first resource allocation scheme is the second resource unit to the $97^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in some of the foregoing implementations, the first resource indicator value K=171, Q=75, and the resource corresponding to the first resource allocation scheme is the second resource unit to the $73^{rd}$ resource unit in the Q consecutive resource units.

Therefore, eight bits may be used for the uplink resource allocation, and the terminal device is scheduled to send the uplink data on 72 RBs, thereby increasing a peak uplink transmission rate of the terminal device.

Alternatively, in some of the foregoing implementations, the first resource indicator value K=78, Q=50, and the resource corresponding to the first resource allocation scheme is the second resource unit to the $49^{th}$ resource unit in the Q consecutive resource units.

Therefore, seven bits may be used for the uplink resource allocation, and the terminal device is scheduled to send the uplink data on 48 RBs, thereby increasing a peak uplink transmission rate of the terminal device.

DESCRIPTION OF EMBODIMENTS

Figure 1:
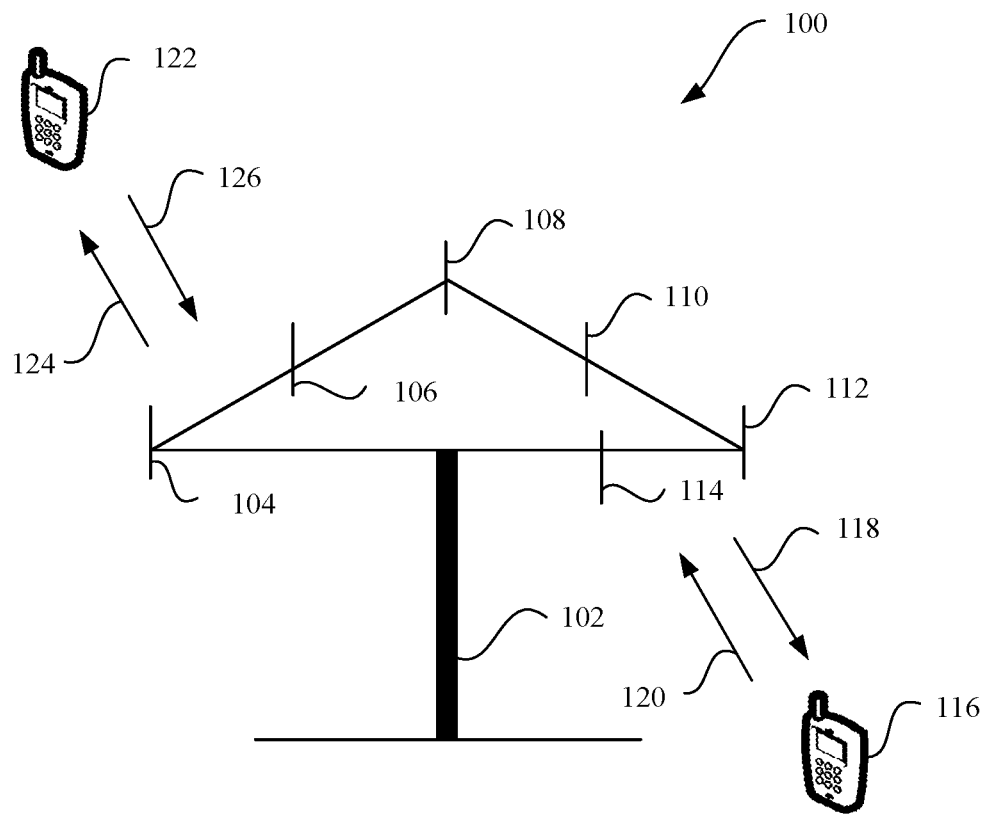
FIG. 1 is a schematic diagram of a resource allocation communications system to which an embodiment of this application is applied.

The following describes the technical solutions of this application with reference to the accompanying drawings.

The technical solutions of the embodiments of this application may be applied to various communications systems, such as a global system for mobile communications (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or a new radio (New Radio, NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, a terminal device in a future evolved public land mobile network (Public Land Mobile Network, PLMN), or the like. This is not limited in the embodiments of this application.

A network device in the embodiments of this application may be a device configured to communicate with the terminal device. The network device may be a base transceiver station (Base Transceiver Station, BTS) in the global system for mobile communications (Global System of Mobile communication, GSM) system or the code division multiple access (Code Division Multiple Access, CDMA) system, may be a NodeB (NodeB, NB) in the wideband code division multiple access (Wideband Code Division Multiple Access, WCDMA) system, may be an evolved NodeB (Evolutional NodeB, eNB or eNodeB) in the LTE system, or may be a radio controller in a cloud radio access network (Cloud Radio Access Network, CRAN) scenario. Alternatively, the network device may be a relay node, an access point, a vehicle-mounted device, a wearable device, a network device in the future 5G network, a network device in the future evolved PLMN, or the like. This is not limited in the embodiments of this application.

FIG. 1 is a schematic diagram of a resource allocation communications system to which an embodiment of this application is applied. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

The network device 102 may communicate with a plurality of terminal devices (such as a terminal device 116 and a terminal device 122). However, it may be understood that the network device 102 may communicate with any quantity of terminal devices that are similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 end information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (Frequency Division Duplex, FDD) system, the forward link 118 and the reverse link 120 may use different frequency bands, and the forward link 124 and the reverse link 126 may use different frequency bands.

For another example, in a time division duplex (Time Division Duplex, TDD) system or a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, an antenna group may be designed to communicate with a terminal device in the sector within coverage of the network device 102. In a process in which the network device 102 communicates with the terminal devices 116 and 122 respectively over the forward links 118 and 124, a transmit antenna of the network device 102 can improve signal-to-noise ratios of the forward links 118 and 124 through beamforming. In addition, in comparison with a manner in which the network device sends, through a single antenna, a signal to all terminal devices served by the network device, in this case, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain (for example, generate, receive from another communications apparatus, or store in a memory) a specific quantity of data bits that are to be sent to the wireless communications receiving apparatus over a channel. The data bits may be included in a transport block (or a plurality of transport blocks) of the data, and the transport block may be segmented to generate a plurality of code blocks.

In addition, the communications system 100 may be a public land mobile network (Public Land Mobile Network, PLMN), a D2D network, an M2M network, or another network. FIG. 1 is merely an example of a simplified schematic diagram. The network may further include another network device that is not shown in FIG. 1.

Before the embodiments of this application are described, the following first briefly describes technical terms in the embodiments of this application.

1. TTI and sTTI

In the embodiments of this application, a resource used in the communications system 100 for wireless communication may be divided into a plurality of TTIs in time domain. The TTI is a commonly used parameter in an existing communications system (for example, an LTE system), and is a scheduling unit for scheduling data transmission on a radio link.

One transmission duration includes N symbols (symbol), where N is a positive integer. A time length of the transmission duration is not limited in this application, in other words, a value of N is not limited. For example, one transmission duration may be one subframe (subframe), one slot (slot), one mini-slot (mini-slot), or one short transmission duration (STD, short Transmission Duration)/short transmission time interval (sTTI, short Transmission Time Interval).

In a wireless communications system, a latency is one of important factors affecting user experience. A latency requirement of constantly emerging new services, for example, services related to the internet of vehicles, becomes increasingly high. Therefore, for the existing LTE system, a transmission mechanism in which a TTI is one subframe already cannot meet a requirement of a low latency service. Therefore, an sTTI-based transmission mechanism emerges accordingly and can effectively reduce a time of packet assembly and code demodulation, to reduce a latency at a physical layer air interface.

In the LTE system, one slot includes six or seven symbols (symbol). One subframe is 1 ms (millisecond), and includes 12 or 14 symbols.

In an NR (New Radio) system, one slot includes 12 or 14 symbols. In the NR system, one subframe is 1 ms, and may include 1, 2, 4, 8, 16, or 32 slots.

The sTTI may include two, three, or seven symbols.

A time length of one symbol is not limited in the embodiments of this application. For example, the length of the symbol may vary for different subcarrier spacings.

2. Resource Element (Resource Element, RE)

The RE may also be referred to as a resource element. The RE may correspond to one symbol in time domain, and may correspond to one subcarrier in frequency domain. In the embodiments of this application, the RE may be an example of a resource unit.

3. Resource Block (Resource Block, RB)

One RB occupies $N_{sc}^{RB}$ consecutive subcarriers in frequency domain, where $N_{sc}^{RB}$ is a positive integer. For example, in an LTE protocol, $N_{sc}^{RB}$ may be equal to 12. In the embodiments of this application, the RB may be defined only in terms of a frequency domain resource. In other words, a quantity of time domain resources occupied by the RB in time domain is not limited. In the embodiments of this application, the RB may be another example of the resource unit.

4. Symbol (Symbol)

The symbol is a minimum unit of a time domain resource. A time length of one symbol is not limited in the embodiments of this application. The length of the symbol may vary for different subcarrier spacings. Symbols may include an uplink symbol and a downlink symbol. By way of example, and not limitation, the uplink symbol may be referred to as a single-carrier frequency division multiple access (Single Carrier-Frequency Division Multiple Access, SC-FDMA) symbol or an orthogonal frequency division multiplexing (Orthogonal Frequency Division Multiplexing, OFDM) symbol. The downlink symbol may be referred to as, for example, an OFDM symbol. It should be noted that, if a new uplink multiple access scheme or downlink multiple access scheme is introduced into a subsequent technology, the term "symbol" may still be used. The uplink multiple access scheme and the downlink multiple access scheme are not limited in this application. In the embodiments of this application, the symbol may be still another example of the resource unit.

5. Resource Unit

The resource unit may be used as a unit of measurement of a resource occupied in time domain, frequency domain, or time-frequency domain. In the embodiments of this application, the resource unit may include, for example, a symbol, an RE, an RB, and a subcarrier. This is not limited in this application.

6. Resource Unit Group

The resource unit group may also be used as another unit of measurement of the resource occupied in time domain, frequency domain, or time-frequency domain. In the embodiments of this application, the resource unit group includes at least one resource unit. For example, one resource unit group includes four resource units. When the resource unit is an RB, one resource unit group includes four RBs.

In the embodiments of this application, the resource unit may be used as the unit of measurement of the resource occupied in frequency domain. Therefore, descriptions of consecutive resource units in the embodiments of this application may be understood as consecutive resource units in frequency domain.

In the prior art, a network device may indicate a resource by using resource allocation information included in downlink control information (Downlink Control Information, DCI), so that a terminal device can send uplink data on the resource.

Compared with a conventional 1 ms TTI transmission mechanism in which one piece of DCI can be used to schedule a resource of 1 ms, in the shortened transmission time interval (shortened Transmission Time Interval, sTTI) transmission mechanism, resource indication information in one piece of DCI can only be used to schedule a resource of two or three symbols. Therefore, in the sTTI transmission mechanism, more DCI is required, increasing resource overheads.

To resolve the foregoing problem, a short resource block group (shortened resource block group, sRBG), namely, one type of the resource unit group described above, is introduced into the sTTI transmission mechanism. One sTTI includes four resource blocks RBs. In this way, a granularity of a resource that can be scheduled by using one piece of DCI is changed from one RB to one sRBG (namely, four RBs), so that a resource of more symbols can be scheduled by scheduling the sRBG.

However, in this manner of scheduling the resource by using the sRBG, the network device can schedule the resource only in the unit of sRBGs, and the network device can schedule only a part of the resource, and cannot effectively configure a relatively large quantity of resources for the terminal device. Consequently, more than 10% of the resource cannot be scheduled, and a waste of system resources is caused.

The following briefly describes a reason for a waste of a system bandwidth in the foregoing technology.

On one hand, in an LTE system, an uplink frequency band is not only used to send uplink data, but also used to send uplink control information. Therefore, usually, in the uplink frequency band, RBs are allocated to a short physical uplink shared channel (shortened Physical Uplink Shared Channel, sPUSCH) used to carry the uplink data, and a specific quantity of RBs are also allocated to a short physical uplink control channel (shortened, Physical Uplink Control Channel, sPUCCH) used to carry the uplink control information.

On the other hand, in uplink resource allocation, a quantity of RBs of a resource scheduled by the network device for the terminal device needs to meet the following condition:

$$M_{RB}^{PUSCH} = 2^{\alpha_2} \cdot 3^{\alpha_3} \cdot 5^{\alpha_5}$$

where $M_{RB}^{PUSCH}$ represents a quantity of RBs used for uplink transmission, and $\alpha_2$, $\alpha_3$, and $\alpha_5$ are non-negative integers.

To be specific, prime factors of the quantity of RBs of the resource scheduled by the network device for the terminal device include only prime factors 2, 3, and 5. Compared with transmission of downlink data, transmission of the uplink data includes one more step of discrete Fourier transform DFT, and a prime factor included in a quantity of RBs directly affects complexity of the DFT. Therefore, when the prime factors include only 2, 3, and 5, the DFT can be implemented in a relatively simple manner. For ease of description, this constraint is referred to as a prime factor constraint in the following.

For example, a bandwidth of 20 MHz is used as an example. If a resource needs to be allocated to an sPUCCH, a largest resource occupied by the sPUSCH can only start from an sRBG #1 (namely, an RB #4) and end at an sRBG #23 (namely, an RB #95), and a total of 92 RBs are occupied. An sRBG #0 and an sRBG #24 are allocated to an (s)PUCCH. In addition, a maximum integer less than or equal to 92 is 80 under the prime factor constraint, to be specific, one sPUSCH can occupy a resource of a maximum of 80 RBs.

For the 1 ms TTI transmission mechanism, one PUSCH can occupy a resource of a maximum of 96 RBs (for example, an RB #2 to an RB #97). Therefore, compared with the PUSCH in the TTI transmission mechanism, the sPUSCH in the sTTI transmission mechanism has a maximum bandwidth loss of 16.7%, causing a capacity loss.

Table 1 shows bandwidth losses corresponding to different bandwidths in the sTTI transmission mechanism.

TABLE 1

|  | 10 MHz | 15 MHz | 20 MHz |
| --- | --- | --- | --- |
| Maximum quantity of available RBs in an sTTI | 40 | 64 | 80 |
| Maximum quantity of available RBs in a 1 ms TTI | 48 | 72 | 96 |
| Bandwidth loss | 16.7% | 11.1% | 16.7% |

It can be learned from Table 1 that, in the sTTI transmission mechanism, bandwidth losses to different degrees exist in all bandwidths except a bandwidth of 5 MHz.

Therefore, to resolve the foregoing problem, the embodiments of this application provide a resource allocation method, to help reduce a system bandwidth loss.

To facilitate understanding of the embodiments of this application, a resource allocation scheme related to the embodiments of this application is first described with reference to FIG. 2.

In addition, for ease of description, the resource allocation scheme in the embodiments of this application is described by using an example in which a resource unit is an RB.

In an existing uplink LTE system, a network device has five types of resource allocation schemes. The resource allocation scheme in the embodiments of this application is a resource allocation scheme of a type 0.

In the resource allocation scheme of the type 0, a resource allocated by the network device to a terminal device is a segment of consecutive RBs. Therefore, each resource allocation scheme may be uniquely determined based on two parameters: a resource length (namely, a quantity of consecutive RBs) and a start location.

Figure 2:
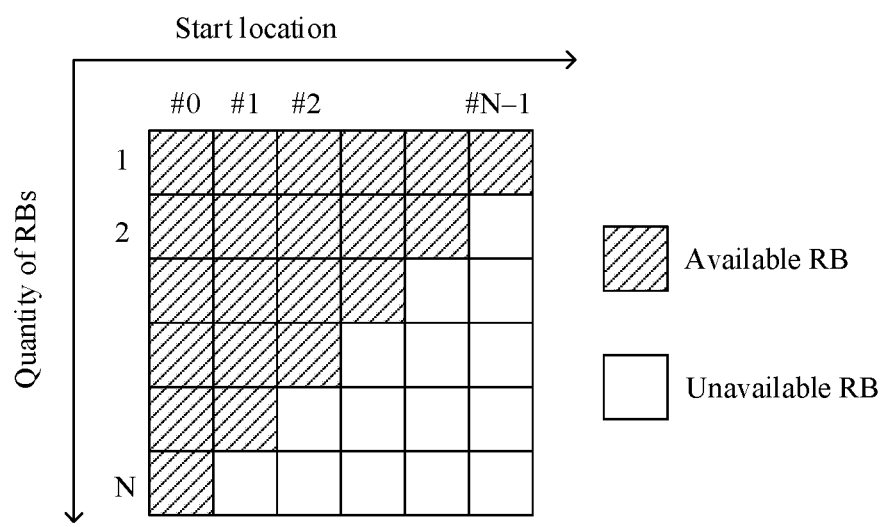
FIG. 2 is a schematic diagram of a relationship between a resource length and a start location of a resource according to an embodiment of this application.

FIG. 2 is a schematic diagram of a relationship between a resource length and a start location of a resource. As shown in FIG. 2, a horizontal coordinate represents the start location of the resource, and a vertical coordinate represents a quantity of RBs occupied by the resource.

It is assumed that a quantity of RBs used for uplink transmission is N, and the network device schedules a resource in the unit of RBs. In this case, if the resource length of the resource is one RB, the start location of the resource may be any one of an RB #0 to an RB #N−1, and there are N possible selections in total; or if the resource length of the resource is two RBs, the start location of the resource may be any one of an RB #0 to an RB #N−2, and there are N−1 possible selections in total.

By analogy, if the resource length of the resource is k RBs, the start location of the resource may be any one of the RB #0 to an RB #N−k, and there are N−k+1 possible selections in total.

If the resource length of the resource is N RBs, the start location of the resource can only be the RB #0, and there is one possible selection in total.

In conclusion, there may be $N(N+1)/2=C_{N+1}^2$ resource allocation schemes for a resource used for the uplink transmission, and $\lceil \log_2 C_{N+1}^2 \rceil$ bits are occupied to represent one resource allocation scheme.

The $C_{N+1}^2$ resource allocation schemes may be represented by using $C_{N+1}^2$ resource indicator values (Resource Indication Value, RIV). Each resource indicator value corresponds to one resource allocation scheme, and each resource allocation scheme includes at least one RB.

A relationship (namely, a relationship #1 for ease of understanding and differentiation) between a resource indicator value RIV and a resource allocation scheme may meet the following conditions:

if $x \leq \lfloor N/2 \rfloor + 1, RIV = N(x-1) + y$; or if $x > \lfloor N/2 \rfloor + 1, RIV = N(N-x+1) + (N-1-y)$.

x represents a quantity of RBs occupied by a resource (namely, a resource length), and y represents an index of a start location of the resource.

Therefore, after obtaining the resource indicator value from resource allocation information according to a preset rule and based on the relationship #1, the terminal device may calculate the quantity of RBs occupied by the resource and the start location of the resource, to determine the resource.

The resource allocation method in the embodiments of this application is described in detail below with reference to FIG. 3 to FIG. 6.

Figure 3:
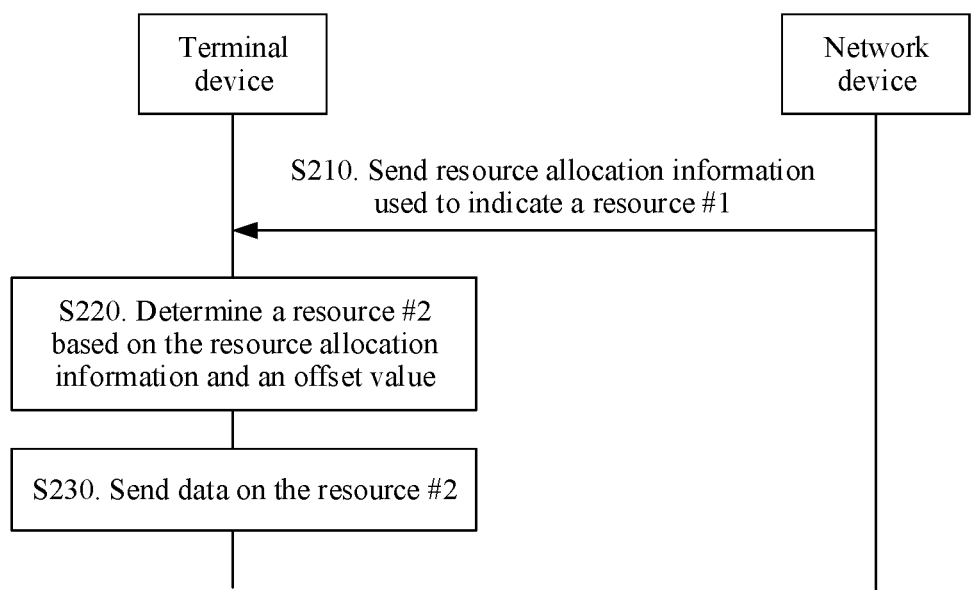
FIG. 3 is a schematic interaction diagram of a resource allocation method according to an embodiment of this application.

FIG. 3 is a schematic interaction diagram of a resource allocation method 200 according to an embodiment of this application. The method may be executed by a terminal device. Steps of the method 200 are described in detail below.

In step S210, a network device sends resource allocation information, where the resource allocation information is used to indicate a Resource #1 (namely, an example of a first resource).

Specifically, the resource allocation information includes a resource indicator value, and the resource indicator value is used to indicate the Resource #1. The terminal device obtains the resource indicator value based on the resource allocation information, and determines the Resource #1 based on the resource indicator value.

For a manner in which the terminal device determines the Resource #1 based on the resource indicator value, refer to the foregoing relationship (namely, the relationship #1) between a resource indicator value and a resource allocation scheme. To be specific, the terminal device determines, based on the resource indicator value RIV and the relationship #1, a quantity of resource units (for example, RBs) occupied by the Resource #1 and a start location (namely, a start resource unit) of the resource #1.

It should be understood that in this embodiment of this application, the network device schedules the resource #1 at a granularity of a resource unit group. In other words, the Resource #1 includes at least one resource unit group. One resource unit group includes X resource units, where X is an integer greater than 1.

It should be noted that when the network device schedules the Resource #1 at the granularity of the resource unit group, for $N = \lfloor Q/X \rfloor$ described above, Q is a quantity of consecutive resource units that corresponds to a system bandwidth.

As described above, the resource allocation information may be carried in DCI. Therefore, to enable the terminal device to obtain the resource allocation information from the DCI, before step S210, the method further includes:

sending, by the network device, indication information #1 to the terminal device, where the indication information #1 is used to indicate an uplink system bandwidth used by a cell;

determining, by the terminal device based on the uplink system bandwidth, a quantity of bits occupied by the resource allocation information in the DCI; and further obtaining, by the terminal device from the DCI according to the preset rule, the resource indicator value included in the resource allocation information corresponding to the quantity of bits.

In a possible implementation, the indication information #1 may be carried in higher layer signaling, or the indication information #1 may be higher layer signaling.

For example, the indication information #1 may be carried in system information. The uplink system bandwidth indicated by the system information is 20 MHz, and corresponds to 100 RBs, in other words, Q=100. If X=4, N=⌊Q/X⌋=⌊100/4⌋=25, to be specific, the system bandwidth of 20 MHz corresponds to 25 resource unit groups. In this case, it can be learned from a formula $\lceil \log_2 C_{N+1}^2 \rceil$ that, in the DCI, the quantity of bits occupied by the resource indicator value in the resource allocation information is $\lceil \log_2 C_{26}^2 \rceil = 9$.

In S220, the terminal device determines a Resource #2 (namely, an example of a second resource) based on the resource allocation information and an offset value, where the offset value indicates a quantity M of resource units that offset from the start location of the Resource #1 relative to a start location of the Resource #2, and the offset value is predefined or configured by using higher layer signaling.

In other words, the terminal device may determine a new resource (namely, the resource #2) based on the Resource #1 and the offset value.

The start location of the Resource #1 represents the start resource unit of the Resource #1. Similarly, the start location of the Resource #2 represents the start location of the resource #2.

The offset value represents the quantity M of consecutive resource units.

In this embodiment of this application, a specific manner in which the terminal device determines the Resource #2 based on the resource allocation information and the offset value may be as follows:

determining the start location of the Resource #2 based on the start location of the Resource #1 and the offset value; and determining the Resource #2 based on the start location of the Resource #2 and a quantity of resource units that corresponds to the resource #1.

For example, it is assumed that the uplink system bandwidth is 20 MHz, the corresponding Q=100, the corresponding X=4, the corresponding M=2, the resource unit is an RB, the start location that is of the Resource #1 and that is calculated based on the relation #1 is the fifth RB (namely, an RB #4), and a quantity of occupied RBs is 92. In this case, an end location of the Resource #1 is the $96^{th}$ RB (namely, an RB #95), and correspondingly, the Resource #1 includes 23 resource unit groups. The start location of the Resource #2 is the seventh RB (namely, an RB #6), a quantity of occupied RBs is still 92, and an end location of the Resource #2 is the $98^{th}$ RB (namely, the RB #95).

In this case, after the Resource #2 is determined, in step S230, the terminal device sends uplink data on the resource #2.

In conclusion, when the network device schedules the Resource #1 in the unit of resource unit groups, an index of the start location of the Resource #1 can only be an integer multiple of X, in other words, the start location of the Resource #1 can only be an $(S+1)^{th}$ resource unit in the system bandwidth, where S is an integer multiple of X. For example, as described above, if X=4, and the resource unit is the RB, the index of the start location of the Resource #1 can only be an RB #0 or the RB #4. Correspondingly, the RB #0 is the first RB in the system bandwidth, and the RB #4 is the fifth RB in the system bandwidth.

Figure 4:
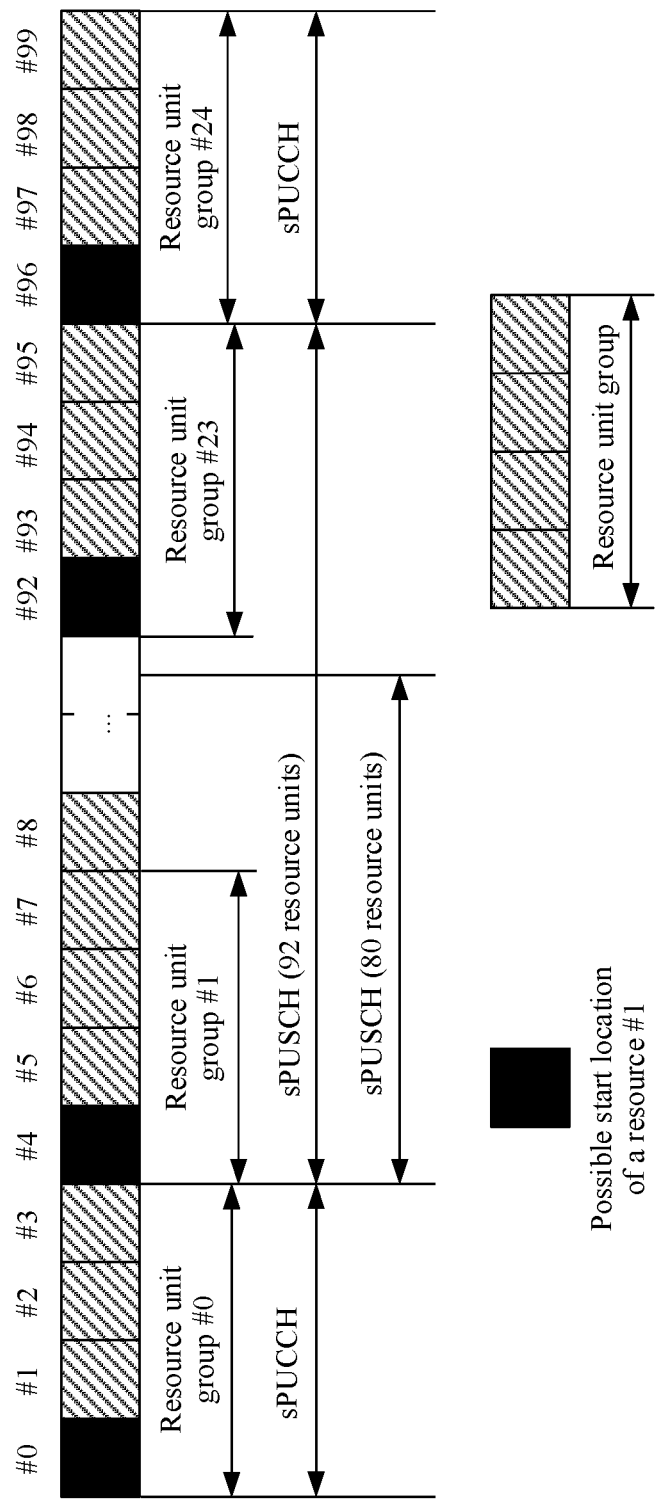
FIG. 4 is a schematic diagram of a resource according to another embodiment of this application.

FIG. 4 shows a resource in a system bandwidth of 20 MHz, where Q=100. In this case, the start location of the Resource #1 can only be RBs in black shadows in the figure.

The offset value is introduced. Therefore, a location of a resource used to send the uplink data can be appropriately changed, so that an index of the start location that is of the Resource #2 and that is obtained after the change is no longer an integer multiple of X, in other words, the start location of the Resource #2 is no longer the $(S+1)^{th}$ resource unit in the system bandwidth, but may be a resource at another start location. The example in which X=4 and the resource unit is the RB is still used. If M=2, when the index of the start location of the Resource #1 is the RB #0, the index of the start location of the Resource #2 may be an RB #2, namely, the third RB in the system bandwidth; similarly, when the index of the start location of the Resource #1 is the RB #4, the index of the start location of the Resource #2 may be the RB #6, namely, the seventh RB in the system bandwidth.

Still as shown in FIG. 4, the start location that is of the Resource #2 and that is determined based on the Resource #1 and the offset value may be one of remaining RBs other than the RBs in black shadows.

Still as shown in FIG. 4, using the example in which the resource unit is the RB, as described above, when the system bandwidth is 20 MHz, if a resource needs to be allocated to an sPUCCH, in the prior art, a largest resource occupied by the sPUSCH can only start from a resource unit group #1 (namely, the RB #4) and end at a resource unit group #23 (namely, the RB #95), and occupies 92 RBs in total, and the resource unit group #0 and the resource unit group #24 are allocated to the sPUCCH. In addition, a maximum integer less than or equal to 92 is 80 under a prime factor constraint, to be specific, one sPUSCH can occupy a resource of a maximum of 80 RBs. It should be understood that locations of 80 RBs that are shown in the figure are merely an example for description. This is not limited in this embodiment of this application.

In this embodiment of this application, the offset value is introduced, and the location of the resource used to send the uplink data is adjusted, so that the index of the start location that is of the Resource #2 and that is obtained after the adjustment is not only the $(S+1)^{th}$ resource unit in the system bandwidth, but may be a resource at any start location. Therefore, more resources can be allocated for transmission of the uplink data, and the prime factor constraint can be relatively well satisfied, thereby reducing a bandwidth loss.

Figure 5:
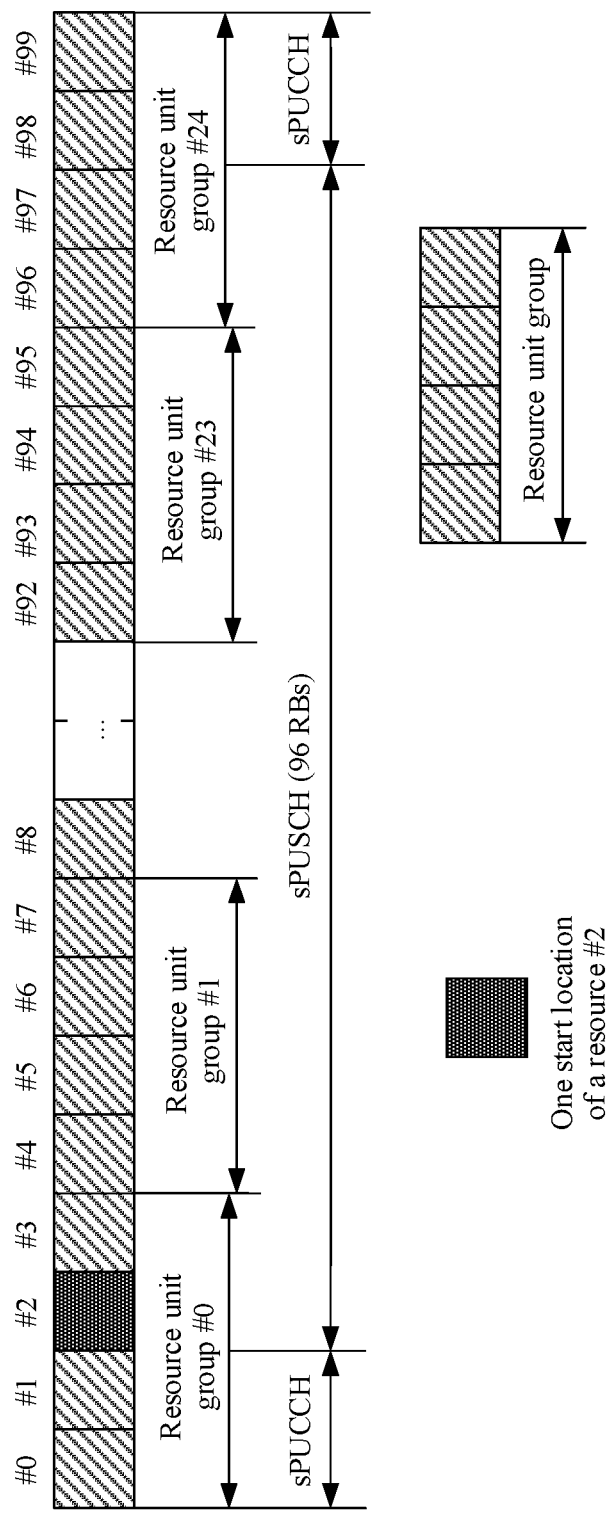
FIG. 5 is a schematic diagram of a resource according to another embodiment of this application.

As shown in FIG. 5, assuming that M=2, if a resource needs to be allocated to the sPUCCH, a largest resource occupied by the sPUSCH may start from the RB #2 and end at an sRB #97, and occupies 96 RBs in total. The RB #0, an RB #1, an RB #98, and an RB #99 are allocated to the sPUCCH. In addition, because $96=96=2^5 \cdot 3^1$, the prime factor constraint is satisfied. In this way, compared with the TTI transmission mechanism, the sTTI transmission mechanism can also enable the network device to schedule 96 RBs.

Therefore, according to the resource allocation method provided in this embodiment of this application, when the network device schedules a resource by using the resource unit group, a start location of the scheduled resource can be effectively adjusted by introducing the offset value, so that the start location of the scheduled resource can be a resource unit other than the $(S+1)^{th}$ resource unit in the system bandwidth, where S is an integer multiple of X, and X is a quantity of resource units included in one resource unit group. In this case, when the resource needs to be allocated to the sPUCCH and the scheduled resource needs to satisfy the prime factor constraint, in this embodiment of this application, the more resources can be allocated for the transmission of the uplink data, and the prime factor constraint is relatively well satisfied, thereby reducing the bandwidth loss.

In addition, DCI overheads can be effectively reduced by predefining the offset value or configuring the offset value by using the higher layer signaling, and DCI reliability can be effectively improved when the resource used to send the uplink data remains unchanged.

In a possible implementation, $1 \leq M \leq (X-1)$.

Therefore, the offset value M is limited, so that as many resources as possible can be used for PUSCH transmission instead of being occupied by a PUCCH, thereby increasing a maximum quantity of resources that can be scheduled for a PUSCH.

In this embodiment of this application, offset values in Table 2 may be introduced for different system bandwidths in a system of the sTTI transmission mechanism, to avoid the bandwidth loss.

|  | 10 MHz | 15 MHz | 20 MHz |
| --- | --- | --- | --- |
| Offset value | 1 | 1 | 2 |
| Maximum quantity of available RBs in an sTTI | 40 | 64 | 80 |
| Maximum quantity of available RBs in a 1 ms TTI | 48 | 72 | 96 |
| Bandwidth loss | 0% | 0% | 0% |

For a system bandwidth of 10 MHz, an offset value of one RB is introduced. A user may send the uplink data on a resource from the RB #1 to an RB #48, and the RB #0 and an RB #49 are allocated to the sPUCCH to send uplink control information. Compared with Table 1, Table 2 shows that an amount of data transmitted on a resource is increased by approximately 16%.

For a system bandwidth of 15 MHz, an offset value of one RB is introduced. A user may use the RB #1 to an RB #2, and the RB #0, an RB #73, and an RB #74 are allocated to the sPUCCH to send uplink control information. Compared with Table 1, Table 2 shows that an amount of data transmitted on a resource is increased by approximately 11%.

For a system bandwidth of 20 MHz, an offset value of two RBs is introduced. A user may use the RB #2 to the RB #97, and the RB #0, the RB #1, the RB #98, and the RB #99 are allocated to the sPUCCH to send uplink control information. Compared with Table 1, Table 2 shows that an amount of data transmitted on a resource is increased by approximately 16%.

In a possible implementation, in this embodiment of this application, the resource indicator value RIV, the start location $RB_{START}$ of the Resource #2, a quantity P of resource unit groups, and the offset value M meet the following relationship:

when $P-1 \leq \lfloor N/2 \rfloor, RIV = N(P-1)+(RB_{START}-N)/X$; or when $P-1 > \lfloor N/2 \rfloor, RIV = N(N-P+1)+[N-1-(RB_{START}-M)/X]$, where RIV indicates the resource indicator value that is included in the resource allocation information and that is used to indicate the resource #1;

$N=\lfloor Q/X \rfloor$, Q is the quantity of resource units that corresponds to the system bandwidth, and both Q and X are integers greater than 1;

$(RB_{START}-M)$ can be exactly divided by X; and

P represents a quantity of resource unit groups included in the Resource #2, and each of the P resource unit groups includes X resource units, where $1 \leq P \leq \lceil N-(RB_{START}-M)/X \rceil$.

To be specific, after obtaining the resource indicator value in the resource allocation information, the terminal device calculates the start location $RB_{START}$ of the Resource #2 and the quantity P of resource unit groups based on the resource indicator value of the Resource #1, the offset value, and the foregoing relationship (denoted as a relationship #2 for ease of differentiation and understanding), to calculate a specific location of the resource #2.

For example, when the bandwidth is 20 MHz, Q=100, X=4, N=25, the offset value M=2, and the resource indicator value in the resource allocation information is 74, it is calculated based on the relationship #2 that the start location of the Resource #1 is the RB #0, and the quantity P of resource unit groups is 24; the start location $RB_{START}=2$ of the Resource #2 is determined based on the start location, namely, the RB #0, of the Resource #1 and the offset value; and then the specific location of the Resource #2 is calculated as the RB #2 to the RB #97 based on the start location $RB_{START}$ of the Resource #2 and the quantity P of resource unit groups.

Figure 6:
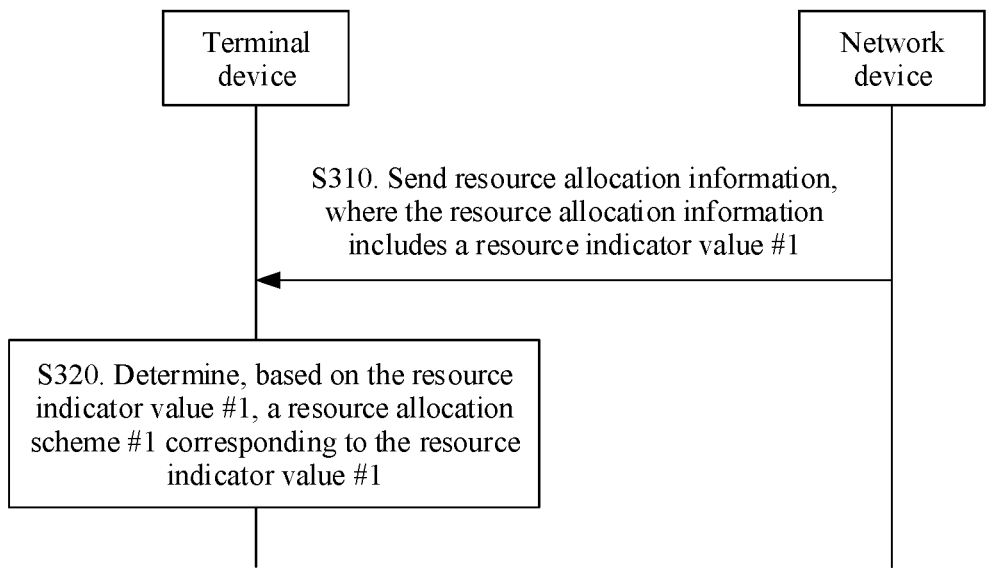
FIG. 6 is a schematic interaction diagram of a resource allocation method according to another embodiment of this application.

FIG. 6 is a schematic interaction diagram of a resource allocation method 300 according to another embodiment of this application. The method may be executed by a terminal device. Steps of the method 300 are described in detail below.

In step S310, a network device sends resource allocation information, where the resource allocation information includes a resource indicator value #1 (namely, an example of a first resource indicator value).

The resource indicator value #1 is used to indicate a resource allocation scheme (for example, a first resource allocation scheme).

In step S320, the terminal device determines, based on the resource indicator value #1, a resource allocation scheme #1 corresponding to the resource indicator value #1.

The first resource allocation scheme belongs to L resource allocation schemes, the L resource allocation schemes include L1 resource allocation schemes, and the L1 resource allocation schemes one-to-one correspond to L1 resource indicator values, where $C_{N+1}^{1} < L \ 2^{\lceil \log_2(C_{N+1}^{2}) \rceil}$, $L1 = L - C_{N+1}^{2}$, $L = \lfloor Q/X \rfloor$, Q is a quantity of resource units that corresponds to a system bandwidth, Q is an integer greater than 1, and X is an integer greater than 2.

A start location of a resource corresponding to each of the L1 resource allocation schemes is a resource unit other than an $(S+1)^{th}$ resource unit in Q consecutive resource units in the system bandwidth, where S is an integer multiple of X.

X is a quantity of resource units included in each of at least one resource unit group included in the resource corresponding to each resource allocation scheme.

Specifically, the network device may configure the L resource allocation schemes, the L resource allocation schemes may be indicated by using L resource indicator values, and each resource indicator value indicates one resource allocation scheme. The L1 resource allocation schemes in the L resource allocation schemes correspond to the L1 resource indicator values, and the start location of the resource corresponding to each of the L1 resource allocation schemes is the resource unit other than the $(S+1)^{th}$ resource unit in the Q consecutive resource units.

In a possible implementation, the L resource allocation schemes further include L2 resource allocation schemes, the L2 resource allocation schemes one-to-one correspond to L2 resource indicator values, and a start location of a resource corresponding to each of the L2 resource allocation schemes is the $(S+1)^{th}$ resource unit in the Q consecutive resource units in the system bandwidth, where $L2=C_{N+1}^2$.

In other words, the L resource allocation schemes may include two types of resource allocation schemes. The following separately describes the two types of resource allocation schemes in detail.

L2 Resource Allocation Schemes

The start location of the resource corresponding to each of the L2 resource allocation schemes is the $(S+1)^{th}$ resource unit in the Q consecutive resource units in the system bandwidth, where $L2=C_{N+1}^2$.

It can be learned from the foregoing descriptions that when a quantity of RBs used for uplink transmission is N, and the network device schedules a resource in the unit of RBs, there may be $C_{N+1}^2$ resource allocation schemes for a resource used for the uplink transmission. Similarly, when a quantity of RBs used for uplink transmission is Q, and the network device schedules a resource in the unit of resource unit groups, there may also be $C_{N+1}^2$ resource allocation schemes for a resource used for the uplink transmission, where $N=\lfloor Q/X \rfloor$.

Therefore, in view of the foregoing reason, $L2=C_{N+1}^2$, and the start location of the resource corresponding to each of the L2 resource allocation schemes is the $(S+1)^{th}$ resource unit in the Q consecutive resource units in the system bandwidth.

FIG. 4 is still used as an example. The system bandwidth is 20 MHz, X=4, and the resource unit is an RB. An RB in a black shadow in FIG. 4 is a possible start location for any one of the L2 resource allocation schemes.

Specifically, if S=0, S+1=1, and a start location of a resource corresponding to one of the L2 resource allocation schemes is the first RB (namely, the RB #0) in the 100 RBs; if S=4, S+1=5, and a start location of a resource corresponding to another of the L2 resource allocation schemes is the fifth RB (namely, the RB #4) in the 100 RBs; if S=8, S+1=9, and a start location of a resource corresponding to one of the L2 resource allocation schemes is the ninth RB (namely, the RB #4) in the 100 RBs; and so on.

As described above, the L2 resource allocation schemes one-to-one correspond to the L2 resource indicator values (where the correspondence is denoted as a correspondence #1A). In this case, the terminal device may determine, based on the resource indicator value #1 and the correspondence #1A, the resource allocation scheme corresponding to the resource indicator value #1.

It should be noted herein that the correspondence #1A may be calculated by using a formula. In other words, in the correspondence #1A, a resource indicator value and a resource corresponding to a resource allocation scheme meet the following condition:

when $x_1 \le \lfloor N/2 \rfloor+1, RIV=N(x_1-1)+y_1$; or when $x_1 > \lfloor N/2 \rfloor+1, RIV=N(N-x_1+1)+(N-1-y_1)$, $N=\lfloor Q/X \rfloor$, and $x_1$ represents a quantity of resource unit groups included in a resource corresponding to a resource allocation scheme; and $y_1$ represents an index of a start resource unit group in the resource corresponding to the resource allocation scheme.

L1 Resource Allocation Schemes

The start location of the resource corresponding to each of the L1 resource allocation schemes is the resource unit other than the $(S+1)^{th}$ resource unit in the Q consecutive resource units.

To be specific, FIG. 4 is still used as an example. The resource corresponding to each of the L1 resource allocation schemes is an RB other than the RBs in black shadows in FIG. 4. In other words, the L1 resource allocation schemes can be used to schedule a resource that cannot be scheduled in the prior art.

In a possible implementation, the L1 resource allocation schemes may be predefined in a system, or may be notified by the network device by using higher layer signaling. This embodiment of this application is not limited thereto.

In this embodiment of this application, to enable the terminal device to determine the resource allocation scheme based on the resource indicator value in the resource allocation information, the L resource allocation schemes one-to-one correspond to the L resource indicator values. The L1 resource allocation schemes correspond to the L1 resource indicator values, and the L2 resource allocation schemes correspond to the L2 resource indicator values.

In this way, the terminal device can determine the corresponding resource allocation scheme (namely, the resource allocation scheme #1) based on the resource indicator value #1 included in the resource allocation information.

Therefore, according to the resource allocation method provided in this embodiment of this application, the L resource allocation schemes are provided, so that the terminal device can send uplink data by using the L resource allocation schemes. The start location of the resource corresponding to each of the L1 resource allocation schemes in the L resource allocation schemes is the resource unit other than the $(S+1)^{th}$ resource unit in the Q consecutive resource units in the system bandwidth, where S is an integer multiple of X, and X is the quantity of resource units included in each of the at least one resource unit group included in the resource corresponding to each resource allocation scheme. In this case, when a resource needs to be allocated to an sPUCCH and a scheduled resource needs to satisfy a prime factor constraint, more resources can be allocated by using the L1 resource allocation schemes for transmission of the uplink data, and the prime factor constraint is relatively well satisfied, thereby reducing a bandwidth loss. Therefore, when the first resource allocation scheme determined by the terminal device belongs to the L1 resource allocation schemes, the bandwidth loss can be effectively reduced.

In a possible implementation, the first resource indicator value K is represented by $\lceil \log_2(C_{N+1}^2) \rceil$ bits.

As described above, when there are $C_{N+1}^2$ resource allocation schemes, one resource indicator value may be represented by $\lceil \log_2(C_{N+1}^2) \rceil$ bits.

In a possible implementation, a value range of the resource indicator value #1 K is $K \in [0, 2^{\lceil \log_2(C_{N+1}^2) \rceil}-1]$, K is an integer, L values in $2^{\lceil \log_2(C_{N+1}^2) \rceil}$ values of K are one resource allocation scheme; and when $K \in [0, C_{N+1}^2-1]$, the resource allocation scheme #1 is any one of the L2 resource allocation schemes; or when $K \in [C_{N+1}^2, L-1]$, the resource allocation scheme #1 is any one of the L1 resource allocation schemes.

Specifically, when K occupies $\lceil \log_2(C_{N+1}^2) \rceil$ bits, the $\lceil \log_2(C_{N+1}^2) \rceil$ bits may represent $2^{\lceil \log_2(C_{N+1}^2) \rceil}$ values. Therefore, the value range of K may be $K \in [0, 2^{\lceil \log_2(C_{N+1}^2) \rceil}-1]$, in other words, a value of K is any value in $K=0, 1, 2, \ldots, 2^{\lceil \log_2(C_{N+1}^2) \rceil}-1$. The L values in the $2^{\lceil \log_2(C_{N+1}^2) \rceil}$ values of K are used to indicate the L resource allocation schemes in this embodiment of this application, and each value is used to indicate one resource allocation scheme.

If $K \in [0, C_{N+1}^2-1]$, the resource allocation scheme #1 is any one of the L2 resource allocation schemes, in other words, the L2 resource allocation schemes one-to-one correspond to $C_{N+1}^2$ values in $K \in [0, C_{N+1}^2-1]$.

If $K \in [0, C_{N+1}^2-1]$, the resource allocation scheme #1 is any one of the L1 resource allocation schemes, in other words, the L1 resource allocation schemes one-to-one correspond to $(L-C_{N+1}^2)$ values in $K \in [C_{N+1}^2, L-1]$.

As described above, the $\lceil \log_n(C_{N+1}^2) \rceil$ bits may represent $2^{\lceil \log_2(C_{N+1}^2) \rceil}$ values, L2 occupies $C_{N+1}^2$ values, and L1 occupies $(L-C_{N+1}^2)$ values. In this case, $(2^{\lceil \log_2(C_{N+1}^2) \rceil}-L)$ values are not used, and may be considered as reserved values that are not used, or may be used for another purpose.

For example, assuming that Q=100, X=4, N=25, and L=400, $C_{N+1}^2$=325, $\lceil \log_2(C_{N+1}^2) \rceil$=9, and $2^{\lceil \log_2(C_{N+1}^2) \rceil}=2^9=512$, to be specific, K occupies nine bits, and the nine bits have 512 values. The L2 resource allocation schemes one-to-one correspond to 325 values in $K \in [0, 324]$, and naturally, L2=325. The L1 resource allocation schemes one-to-one correspond to 75 values in $K \in [325, 399]$, and naturally, L1=75. Remaining (512−400)=112 values are reserved values that are not used.

By way of example, and not limitation, the L2 resource allocation schemes may correspond to any L2 values in the $2^{\lceil \log_2(C_{N+1}^2) \rceil}$ values, the L1 resource allocation log schemes may correspond to any L1 values in the $2^{\lceil \log_2(C_{N+1}^2) \rceil}$ values, and L1 and L2 are not equal.

Therefore, according to the resource allocation method provided in this embodiment of this application, the $C_{N+1}^2$ values in $[0, C_{N+1}^2-1]$ one-to-one correspond to the L2 resource allocation schemes, and if $K \in [0, C_{N+1}^2-1]$, the first resource allocation scheme is any one of the L2 resource allocation schemes. The $(L-C_{N+1}^2)$ values in $[C_{N+1}^2, L-1]$ one-to-one correspond to the L1 resource allocation schemes, and if $K \in [C_{N+1}^2, L-1]$, the first resource allocation scheme is any one of the L1 resource allocation schemes. In this way, more optional schemes can be added for uplink resource allocation without increasing a quantity of resource indicator values, thereby improving flexibility of the uplink resource allocation.

In a possible implementation, the first resource indicator value K=325, Q=100, and a resource corresponding to the first resource allocation scheme is the third resource unit to the $98^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in a possible implementation, the first resource indicator value K=326, Q=100, and a resource corresponding to the first resource allocation scheme is the second resource unit to the $97^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in a possible implementation, the first resource indicator value K=326, Q=100, and a resource corresponding to the first resource allocation scheme is the third resource unit to the $98^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in a possible implementation, the first resource indicator value K=325, Q=100, and a resource corresponding to the first resource allocation scheme is the second resource unit to the $97^{th}$ resource unit in the Q consecutive resource units.

Therefore, nine bits may be used for the uplink resource allocation, and the terminal device is scheduled to send the uplink data on 96 RBs, thereby increasing a peak uplink transmission rate of the terminal device.

Alternatively, in a possible implementation, the first resource indicator value K=171, Q=75, and a resource corresponding to the first resource allocation scheme is the second resource unit to the $73^{rd}$ resource unit in the Q consecutive resource units.

Therefore, eight bits may be used for the uplink resource allocation, and the terminal device is scheduled to send the uplink data on 72 RBs, thereby increasing a peak uplink transmission rate of the terminal device.

Alternatively, in a possible implementation, the first resource indicator value K=78, Q=50, and a resource corresponding to the first resource allocation scheme is the second resource unit to the $49^{th}$ resource unit in the Q consecutive resource units.

Therefore, seven bits may be used for the uplink resource allocation, and the terminal device is scheduled to send the uplink data on 48 RBs, thereby increasing a peak uplink transmission rate of the terminal device.

The foregoing describes the resource allocation method according to the embodiments of this application in detail with reference to FIG. 1 to FIG. 6. The following describes a resource allocation apparatus according to the embodiments of this application with reference to FIG. 7 to FIG. 10. The technical features described in the method embodiments are also applicable to the following apparatus embodiments.

Figure 7:
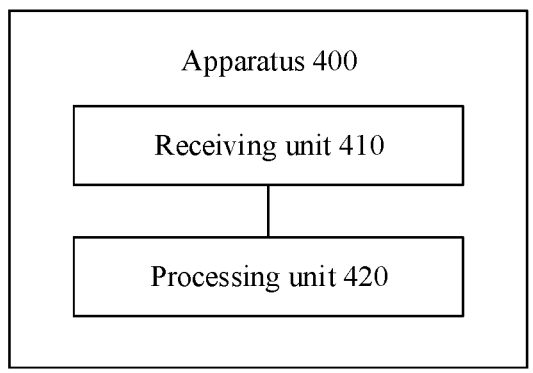
FIG. 7 to FIG. 10 each show a resource allocation apparatus according to an embodiment of this application.

FIG. 7 is a schematic block diagram of a resource allocation apparatus 400 according to an embodiment of this application. As shown in FIG. 7, the apparatus 400 includes:

a receiving unit 410, configured to receive resource allocation information, where the resource allocation information includes a first resource indicator value; and a processing unit 420, configured to determine, based on the first resource indicator value, a first resource allocation scheme corresponding to the first resource indicator value.

The first resource allocation scheme belongs to L resource allocation schemes, the L resource allocation schemes include L1 resource allocation schemes, and the L1 resource allocation schemes one-to-one correspond to L1 resource indicator values, where $C_{N+1}^2 < L \leq 2^{\lceil \log_2(C_{N+1}^2) \rceil}$, $L1=L-C_{N+1}^2$, $N=\lfloor Q/X \rfloor$, Q is a quantity of resource units that corresponds to a system bandwidth, Q is an integer greater than 1, and X is an integer greater than 2.

A start location of a resource corresponding to each of the L1 resource allocation schemes is a resource unit other than an $(S+1)^{th}$ resource unit in Q consecutive resource units in the system bandwidth, where S is an integer multiple of X.

In a possible implementation, the L resource allocation schemes further include L2 resource allocation schemes, the L2 resource allocation schemes one-to-one correspond to L2 resource indicator values, and a start location of a resource corresponding to each of the L2 resource allocation schemes is the $(S+1)^{th}$ resource unit in the Q consecutive resource units in the system bandwidth, where $L2=C_{N+1}^2$.

In a possible implementation, a value range of the first resource indicator value K is $K \in [0, 2^{\lceil \log_2(C_{N+1}^2) \rceil}-1]$, K is an integer, L values $2^{\lceil \log_2(C_{N+1}^2) \rceil}$ values of K are used to indicate the L resource allocation schemes, and each value is used to indicate one resource allocation scheme; and when $K \in [0, C_{N+1}^2-1]$, the first resource allocation scheme is any one of the L2 resource allocation schemes; or when $K \in [C_{N+1}^2, L-1]$, the first resource allocation scheme is any one of the L1 resource allocation schemes.

In a possible implementation, the first resource indicator value K is represented by $\lceil \log_2(C_{N+1}^2) \rceil$ bits.

In a possible implementation, X=4.

The resource allocation apparatus 400 may correspond to the terminal device described in the method 200 (for example, may be configured in the terminal device or may be the terminal device), and modules or units in the resource allocation apparatus 400 are separately configured to perform actions or processing processes performed by the terminal device in the method 200. To avoid repetition, detailed descriptions are omitted herein.

In this embodiment of this application, the apparatus 400 may be a terminal device. The terminal device may include a processor, a transmitter, and a receiver. The processor, the transmitter, and the receiver are communicatively connected. Optionally, the terminal device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 410 in the apparatus 400 shown in FIG. 7 may correspond to the receiver of the terminal device.

The processing unit 420 shown in FIG. 7 may correspond to the processor of the terminal device, and a sending unit 430 shown in FIG. 7 may correspond to the transmitter of the terminal device. In another implementation, the transmitter and the receiver may be implemented by a same component, namely, a transceiver.

In this embodiment of this application, the apparatus 400 may be a chip (in other words, a chip system) installed in a terminal device. In this case, the apparatus 400 may include a processor and an input/output interface. The processor may be communicatively connected to a transceiver of the terminal device via the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 410 in the apparatus 400 shown in FIG. 7 may correspond to the input interface, and the processing unit 420 shown in FIG. 7 may be the processor.

Figure 8:
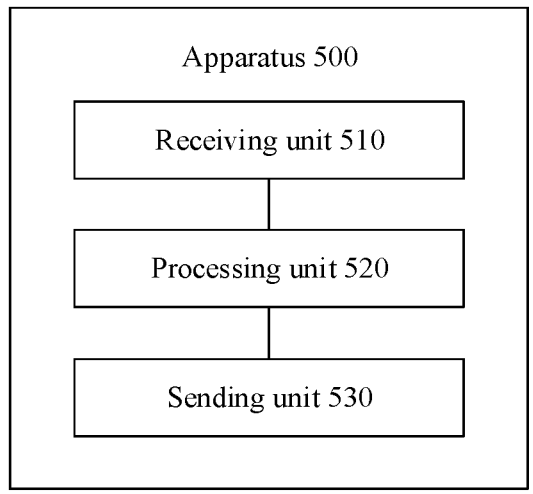

FIG. 8 is a schematic block diagram of a resource allocation apparatus 500 according to an embodiment of this application. As shown in FIG. 8, the apparatus 500 includes:

a receiving unit 510, configured to receive resource allocation information, where the resource allocation information is used to indicate a first resource;

a processing unit 520, configured to determine a second resource based on the resource allocation information and an offset value, where the offset value indicates a quantity M of resource units that offset from a start location of the first resource relative to a start location of the second resource, and the offset value is predefined or configured by using higher layer signaling, where M≥1; and a sending unit 530, configured to send uplink data on the second resource.

In a possible implementation, 1≤M≤(X−1), X is a quantity of resource units included in each of at least one resource unit group included in a system bandwidth, and X is an integer greater than 2.

In a possible implementation, the processing unit 520 is specifically configured to:

determine the start location of the second resource based on the start location of the first resource and the offset value; and determine the second resource based on the start location of the second resource and a quantity of resource units that corresponds to the first resource.

In a possible implementation, the resource indicator value RIV, the start location $RB_{START}$ of the second resource, a quantity P of resource unit groups, and the offset value M meet the following relationship:

when $P-1 \leq \lfloor N/2 \rfloor, RIV=N(P-1)+(RB_{START}-M)/X$; or when $P-1 > \lfloor N/2 \rfloor, RIV=N(N-P+1)+[N-1-(RB_{START}-M)/X]$, where RIV indicates the resource indicator value that is included in the resource allocation information and that is used to indicate the first resource;

$N=\lfloor Q/X \rfloor$, Q is a quantity of resource units that corresponds to the system bandwidth, Q is an integer greater than 1, and X is an integer greater than 2; and P indicates the quantity of resource unit groups included in the second resource, and each of the P resource unit groups includes X resource units, where $1 \leq P \leq [N-(RB_{START}-M)/X]$.

In a possible implementation, X=4.

The resource allocation apparatus 500 may correspond to the terminal device described in the method 300 (for example, may be configured in the terminal device or may be the terminal device), and modules or units in the resource allocation apparatus 500 are separately configured to perform actions or processing processes performed by the terminal device in the method 300. To avoid repetition, detailed descriptions are omitted herein.

In this embodiment of this application, the apparatus 500 may be a terminal device. The terminal device may include a processor, a transmitter, and a receiver. The processor, the transmitter, and the receiver are communicatively connected. Optionally, the terminal device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 510 shown in FIG. 8 may correspond to the receiver of the terminal device, the processing unit 520 shown in FIG. 8 may correspond to the processor of the terminal device, and the receiving unit 530 shown in FIG. 8 may correspond to the transmitter of the terminal device.

In this embodiment of this application, the apparatus 500 may be a chip (in other words, a chip system) installed in a terminal device. In this case, the apparatus 500 may include a processor and an input/output interface. The processor may be communicatively connected to a transceiver of the terminal device via the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 510 in the apparatus 500 shown in FIG. 8 may correspond to the input interface, the processing unit 520 shown in FIG. 8 may correspond to the processor, and the receiving unit 530 in the apparatus 500 shown in FIG. 8 may correspond to the input interface.

Figure 9:
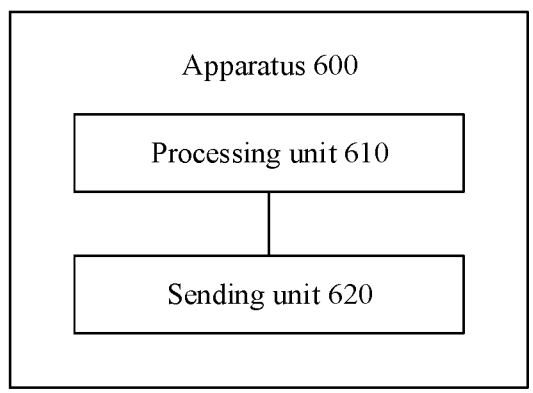

FIG. 9 is a schematic block diagram of a resource allocation apparatus 600 according to an embodiment of this application. As shown in FIG. 9, the apparatus 600 includes:

a processing unit 610, configured to generate resource allocation information, where the resource allocation information includes a first resource indicator value, the first resource indicator value is used to indicate a first resource allocation scheme, the first resource allocation scheme belongs to L resource allocation schemes, the L resource allocation schemes include L1 resource allocation schemes, and the L1 resource allocation schemes one-to-one correspond to L1 resource indicator values, where $C_{N+1}^2 < L \leq 2^{\lceil log_2(C_{N+1}^2) \rceil}$, $L1 = L - C_{N+1}^2$, $N = \lfloor Q/X \rfloor$, Q is a quantity of resource units that corresponds to a system bandwidth, Q is an integer greater than 1, and X is an integer greater than 2; and a start location of a resource corresponding to each of the L1 resource allocation schemes is a resource unit other than an $(S+1)^{th}$ resource unit in Q consecutive resource units in the system bandwidth, where S is an integer multiple of X; and a sending unit 620, configured to send the resource allocation information.

In a possible implementation, the L resource allocation schemes further include L2 resource allocation schemes, the L2 resource allocation schemes one-to-one correspond to L2 resource indicator values, and a start location of a resource corresponding to each of the L2 resource allocation schemes is the $(S+1)^{th}$ resource unit in the Q consecutive resource units in the system bandwidth, where $L2 = C_{N+1}^2$.

In a possible implementation, a value range of the first resource indicator value K is $K \in [0, 2^{\lceil log_2(C_{N+1}^2) \rceil} - 1]$, K is an integer, L values $2^{\lceil log_2(C_{N+1}^2) \rceil}$ values of K are used to indicate the L resource allocation schemes, and each of the L values is used to indicate one resource allocation scheme; and when $K \in [0, C_{N+1}^2 - 1]$, the first resource allocation scheme is any one of the L2 resource allocation schemes; or when $K \in [C_{N+1}^2, L-1]$, the first resource allocation scheme is any one of the L1 resource allocation schemes.

In a possible implementation, the first resource indicator value K is represented by $\lceil log_2(C_{N+1}^2) \rceil$ bits.

In a possible implementation, X=4.

The resource allocation apparatus 600 may correspond to the network device described in the method 200 (for example, may be configured in the network device or may be the network device), and modules or units in the resource allocation apparatus 600 are separately configured to perform actions or processing processes performed by the network device in the method 200. To avoid repetition, detailed descriptions are omitted herein.

In this embodiment of this application, the apparatus 600 may be a network device. The network device may include a processor, a transmitter, and a receiver. The processor, the transmitter, and the receiver are communicatively connected. Optionally, the network device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the processing unit 610 shown in FIG. 9 may correspond to the processor of the network device, and the sending unit shown in FIG. 9 may correspond to the transmitter of the network device. In another implementation, the transmitter and the receiver may be implemented by a same component, namely, a transceiver.

In this embodiment of this application, the apparatus 600 may be a chip (in other words, a chip system) installed in a network device. In this case, the apparatus 600 may include a processor and an input/output interface. The processor may be communicatively connected to a transceiver of the network device via the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the processing unit 610 shown in FIG. 9 may correspond to the processor, and the sending unit 610 in the apparatus 600 shown in FIG. 9 may correspond to the output interface.

Figure 10:
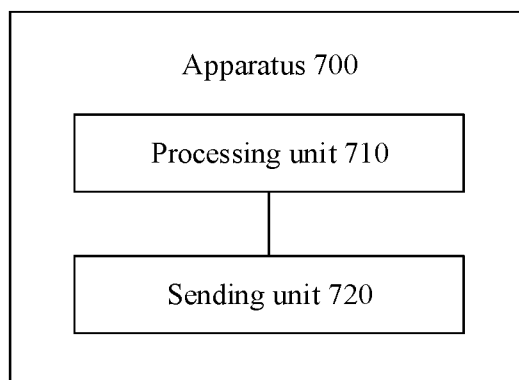

FIG. 10 is a schematic block diagram of a resource allocation apparatus 700 according to an embodiment of this application. As shown in FIG. 10, the apparatus 700 includes:

a processing unit 710, configured to generate resource allocation information, where the resource allocation information is used to indicate a first resource, a quantity of resource units that offset from a start location of the first resource relative to a start location of a second resource is M, M is predefined or configured by using higher layer signaling, $M \geq 1$, and the second resource is used to indicate a terminal device to send uplink data on the second resource; and a sending unit 720, configured to send the resource allocation information.

In a possible implementation, $1 \leq M \leq (X-1)$, and X is a quantity of resource units included in each of at least one resource unit group included in a system bandwidth.

In a possible implementation, a resource indicator value RIV, the start location $RB_{START}$ of the second resource, a quantity P of resource unit groups, and M meet the following relationship:

when $P-1 \leq \lfloor N/2 \rfloor, RIV = N(P-1) + (RB_{START} - M)/X$; or when $P-1 > \lfloor N/2 \rfloor, RIV = N(N-P+1) + [N-1-(RB_{START} - M)/X]$, where RIV indicates the resource indicator value that is included in the resource allocation information and that is used to indicate the first resource;

$N = \lfloor Q/X \rfloor$, Q is a quantity of resource units that corresponds to the system bandwidth, Q is an integer greater than 1, and X is an integer greater than 2; and P indicates the quantity of resource unit groups included in the second resource, and each of the P resource unit groups includes X resource units, where $1 \leq P \leq [N-(RB_{START} - M)/X]$.

In a possible implementation, the sending unit 720 is further configured to:

send the higher layer signaling, where the higher layer signaling is used to indicate M.

In a possible implementation, X=4.

The resource allocation apparatus 700 may correspond to the network device described in the method 300 (for example, may be configured in the network device or may be the network device), and modules or units in the resource allocation apparatus 700 are separately configured to perform actions or processing processes performed by the network device in the method 300. To avoid repetition, detailed descriptions are omitted herein.

In this embodiment of this application, the apparatus 700 may be a network device. The network device may include a processor, a transmitter, and a receiver. The processor, the transmitter, and the receiver are communicatively connected. Optionally, the network device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the processing unit 710 shown in FIG. 10 may correspond to the processor of the network device, and the sending unit shown in FIG. 10 may correspond to the transmitter of the network device. In another implementation, the transmitter and the receiver may be implemented by a same component, namely, a transceiver.

In this embodiment of this application, the apparatus 700 may be a chip (in other words, a chip system) installed in a network device. In this case, the apparatus 700 may include a processor and an input/output interface. The processor may be communicatively connected to a transceiver of the network device via the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the processing unit 710 shown in FIG. 10 may correspond to the processor, and the sending unit 720 in the apparatus 700 shown in FIG. 10 may correspond to the output interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for resource allocation, comprising:

receiving, by a terminal device, resource allocation information that indicates a first resource;

determining, by the terminal device, a second resource based on the resource allocation information and an offset value represented by M, wherein the offset value is configured based on higher layer signaling and indicates a start location of first resource offsets from a start location of the second resource by M resource units; and sending, by the terminal device, uplink data on the second resource to a network device wherein a resource indicator value (MV), the start location of the second resource represented by ($RB_{START}$), a quantity P of resource unit groups, and the offset value satisfies:

when $P-1 \leq \lfloor N/2 \rfloor, RIV=N(P-1)+(RB_{START}-M)/X$; or when $P-1 > \lfloor N/2 \rfloor, RIV=N(N-P+1)+[N-1-(RB_{START}-M)/X]$, where RIV indicates the first resource and is comprised in the resource allocation information, $N=\lfloor Q/X \rfloor$, Q is a quantity of resource units that corresponds to a system bandwidth, Q is an integer greater than 1, X is an integer greater than 2, P indicates a quantity of resource unit groups comprised in the second resource, and each of the P resource unit groups comprises X resource units, wherein $1 \leq P \leq [N-(RB_{START}-M)/X]$.

2. The method according to claim 1, wherein $1 \leq M \leq (X-1)$, and X is a quantity of resource units comprised in each of at least one resource unit group comprised in a system bandwidth, and X is an integer greater than 2.

3. The method according to claim 1, wherein the determining the second resource based on the resource allocation information and the offset value comprises:

determining, by the terminal device, the start location of the second resource based on the start location of the first resource and the offset value; and determining, by the terminal device, the second resource based on the start location of the second resource and a quantity of resource units corresponding to the first resource.

4. The method according to claim 2, wherein X=4.

5. A method for resource allocation, comprising:

generating, by a network device, resource allocation information and an offset value represented by M, wherein the resource allocation information indicates a first resource, the offset value is configured based on higher layer signaling and indicates a start location of first resource offsets from start location of a second resource by M resource units, and the second resource indicates a terminal device to send uplink data on the second resource; and sending, by the network device, the resource allocation information to the terminal device, wherein a resource indicator value (RIV), the start location of the second resource represented by ($RB_{START}$), a quantity P of resource unit groups, and the offset value satisfies:

when $P-1 \leq \lfloor N/2 \rfloor, RIV=N(P-1)+(RB_{START}-M)/X$; or when $P-1 > \lfloor N/2 \rfloor, RIV=N(N-P+1)+[N-1-(RB_{START}-M)/X]$, where RIV indicates the first resource and is comprised in the resource allocation information, $N=\lfloor Q/X \rfloor$, Q is a quantity of resource units that corresponds to a system bandwidth, Q is an integer greater than 1, X is an integer greater than 2, P indicates a quantity of resource unit groups comprised in the second resource, and each of the P resource unit groups comprises X resource units, wherein $1 \leq P \leq [N-(RB_{START}-M)/X]$.

6. The method according to claim 5, wherein $1 \leq M \leq (X-1)$, and X is a quantity of resource units comprised in each of at least one resource unit group comprised in a system bandwidth, and X is an integer greater than 2.

7. The method according to claim 5, further comprising:

sending, by the network device, the higher layer signaling that indicates the offset value.

8. The method according to claim 6, wherein X=4.

9. An apparatus, comprising:

at least one processor; and a non-transitory computer-readable storage medium coupled to the at least one processor and storing programming instructions for execution by the at least one processor, the programming instructions instruct the at least one processor to:

receive resource allocation information that indicates a first resource;

determine a second resource based on the resource allocation information and an offset value, wherein the offset value is configured based on higher layer signaling and indicates that a start location of first resource offsets from a start location of the second resource by M resource units; and send uplink data on the second resource to a network device, wherein a resource indicator value (MV), the start location of the second resource represented by ($RB_{START}$), a quantity P of resource unit groups, and the offset value satisfies:

when $P-1 \leq \lfloor N/2 \rfloor, RIV=N(P-1)+(RB_{START}-M)/X$; or when $P-1 > \lfloor N/2 \rfloor, RIV=N(N-P+1)+[N-1-(RB_{START}-M)/X]$, where RIV indicates the first resource and is comprised in the resource allocation information, $N=\lfloor Q/X \rfloor$, Q is a quantity of resource units that corresponds to a system bandwidth, Q is an integer greater than 1, X is an integer greater than 2, P indicates a quantity of resource unit groups comprised in the second resource, and each of the P resource unit groups comprises X resource units, wherein $1 \leq P \leq [N-(RB_{START}-M)/X]$.

10. The apparatus according to claim 9, wherein $1 \leq M \leq (X-1)$, and X is a quantity of resource units comprised in each of at least one resource unit group comprised in a system bandwidth, and X is an integer greater than 2.

11. The apparatus according to claim 9, wherein the programming instructions further instruct the at least one processor to:

determine the start location of the second resource based on the start location of the first resource and the offset value; and determine the second resource based on the start location of the second resource and a quantity of resource units corresponding to the first resource.

12. The apparatus according to claim 10, wherein X=4.

13. An apparatus, comprising:

at least one processor; and a non-transitory computer-readable storage medium coupled to the at least one processor and storing programming instructions for execution by the at least one processor, the programming instructions instruct the at least one processor to:

generate resource allocation information, wherein the resource allocation information indicates a first resource, a start location of first resource offsets from a start location of a second resource by M resource units, M is configured based on higher layer signaling, and the second resource indicates a terminal device to send uplink data on the second resource; and send the resource allocation information to the terminal device, wherein a resource indicator value (RIV), the start location of the second resource represented by ($RB_{START}$), a quantity P of resource unit groups, and an offset value satisfies:

when $P-1 \leq \lfloor N/2 \rfloor$, $RIV = N(P-1) + (RB_{START} - M)/X$; or when $P-1 > \lfloor N/2 \rfloor$, $RIV = N(N-P+1) + [N-1-(RB_{START} - M)/X]$, where RIV indicates the first resource and is comprised in the resource allocation information, $N = \lfloor Q/X \rfloor$, Q is a quantity of resource units that corresponds to a system bandwidth, Q is an integer greater than 1, X is an integer greater than 2, P indicates a quantity of resource unit groups comprised in the second resource, and each of the P resource unit groups comprises X resource units, wherein $1 \leq P \leq [N-(RB_{START}-M)/X]$.

14. The apparatus according to claim 13, wherein $1 \leq M \leq (X-1)$, and X is a quantity of resource units comprised in each of at least one resource unit group comprised in a system bandwidth.

15. The apparatus according to claim 13, wherein the programming instructions further instruct the at least one processor to:

send the higher layer signaling-that indicates the offset value.

16. The apparatus according to claim 14, wherein X=4.

* * * * *

UNITED STATES PATENT AND TRADEMARK OFFICE
CERTIFICATE OF CORRECTION

PATENT NO. : 11,490,409 B2
APPLICATION NO. : 17/062313
DATED : November 1, 2022
INVENTOR(S) : Liyan Su, Chaojun Li and Zhihua Tang It is certified that error appears in the above-identified patent and that said Letters Patent is hereby corrected as shown below:

In the Claims

Column 28/Line 64 - In Claim 1, delete "device" and insert -- device, --.

Column 28/Line 65 - In Claim 1, delete "(MV)," and insert -- (RIV), --.

Column 29/Line 16 - In Claim 2, delete "and X" and insert -- X --.

Column 30/Line 18 (Approx.) - In Claim 9, delete "(MV)," and insert -- (RIV), --.

Column 30/Line 38 - In Claim 10, delete "and X" and insert -- X --.

Signed and Sealed this
Twenty-third Day of May, 2023

Katherine Kelly Vidal
*Director of the United States Patent and Trademark Office*